US006643625B1

(12) United States Patent
Acosta et al.

(10) Patent No.: US 6,643,625 B1
(45) Date of Patent: Nov. 4, 2003

(54) SYSTEM AND METHOD FOR AUDITING LOAN PORTFOLIOS AND LOAN SERVICING PORTFOLIOS

(75) Inventors: Oscar E. Acosta, Corona, CA (US); Mark S. Bill, Blue Bell, PA (US)

(73) Assignee: GE Mortgage Holdings, LLC, Raleigh, NC (US)

( * ) Notice: Subject to any disclaimer, the term of this patent is extended or adjusted under 35 U.S.C. 154(b) by 0 days.

(21) Appl. No.: 09/466,753

(22) Filed: Dec. 17, 1999

(51) Int. Cl.[7] ............................................. G06F 17/60
(52) U.S. Cl. ............................ 705/38; 705/11; 705/30
(58) Field of Search ................................ 705/38, 11, 30

(56) References Cited

U.S. PATENT DOCUMENTS

| 5,689,650 | A | * | 11/1997 | McClelland et al. | ........... 705/36 |
| 5,937,160 | A | * | 8/1999 | Davis et al. | ................... 709/23 |
| 6,029,144 | A | * | 2/2000 | Barrett et al. | ................. 705/30 |
| 6,263,314 | B1 | * | 7/2001 | Donner | ........................... 705/1 |

FOREIGN PATENT DOCUMENTS

| EP | 0 430 540 A2 | * | 5/1991 | ........... G06F/15/24 |

OTHER PUBLICATIONS

Robert W. Brown, How to Develop a Mre Effective Audit Checklist, Quality Progress v30n2, Feb. 1997, pp. 144.*

J. C. Robertson & F. G. Davis, Auditing, Third EditionBusiness Publications, Inc., 1982. pp 42, 158, 160–163, 219–222, 241–246, 257–259, 293–294, 331–346, 384–390, 691–692, 704.*

"ACES™ Automated Compliance & Evaluation System", product catalog published by Engineered Business Systems, Inc., Coconut Creek, Florida, on or before Jul. 8, 1996.

* cited by examiner

Primary Examiner—Vincent Millin
Assistant Examiner—Charles R. Kyle
(74) Attorney, Agent, or Firm—Priest & Goldstein, PLLC

(57) ABSTRACT

A computer-assisted method of auditing of loan portfolios and loan servicing portfolios wherein the loans are of a plurality of types by keying questions which determine compliance with a large, complex, and constantly changing set legal requirements to a set of selectable audit types. When an audit type is selected, the system uses sampling methods to select a set of loans of that type to audit and generates a checklist comprising a set of questions keyed to the particular type of audit.

26 Claims, 6 Drawing Sheets

Fig. 3

SYSTEM AND METHOD FOR AUDITING LOAN PORTFOLIOS AND LOAN SERVICING PORTFOLIOS

BACKGROUND OF THE INVENTION

This invention relates to servicing of loan portfolios and loan servicing portfolios.

The field of lending money is very complex, and has many different facets. Financial institutions are subject to various legal and regulatory requirements regarding lending, security interests, qualification of borrowers and property for various loan insurance programs, and the like. Among the regulatory requirements are those of RESPA (Real Estate Settlement Procedures Act), HUD (Federal Housing Administration), VA (Veterans Administration), FNMA (Fannie Mae), FHMLC (Freddie Mac), various states, and the like. Furthermore, in order to securitize a collection of loans in a portfolio, the financial institution must assure or guarantee to investors not only full regulatory compliance, but also certain quality of loan statistics for the portfolio being sold or purchased. Investors and investment bankers frequently have special criteria for loan quality and auditing.

The legal and regulatory requirements and investors parameters frequently change, and financial institutions must expend considerable resources to assure that all of their loans are in full compliance with the current applicable regulations.

For mortgage companies to comply with all of the various requirements for the auditing loan originations, the current state of the art is to use a standard checklist, regardless of the type of loan portfolio audit.

When portfolios of loans are sold to investors or are purchased from originators or other investors, audit checklists must be reviewed by several people to insure that each loan complies with currently applicable regulations.

The audit checklists which are in current use are required in primarily three different aspects of this industry: origination of the loan, selling of the loan to investors, and servicing the loan. Although these aspects are separate insofar as they are usually handled by different personnel with different training and skill requirements, they are intererelated insofar as a mistake in one area, e.g., origination, will have spillover effect on another area, e.g., servicing.

Because quality control of each aspect of these processes is so critical, various attempts have been made by others to provide computerized quality control systems, for example the ACES audit system of Engineered Business Systems, Inc., of Coconut Creek, Fla., provides automated loan selection based on user defined criteria, standard checklists, automated underwriting review, and automated tracking of supervisor review. The ACES system does not provide checklists automatically customized to audit sampling criteria, nor a system for auditing servicing portfolios, not a means for storing and reporting on audit recommendations pertaining to exceptions. The ACES system does not address the special needs of loan servicing auditor, where special regulations and audit checklist are required.

SUMMARY OF THE INVENTION

The present invention provides in one aspect a client-server computer system for auditing loan and loan servicing portfolios comprising client workstations for use by loan auditors a server on which are stored records for each loan origination and loan servicing in a portfolio, rules which comprise each current and historical legal regulation and any investor-specific parameter, applicable to each type of loan and loan servicing, a set of sampling criteria, a set of questions to determine compliance with each of the regulations and parameters, each question keyed to one or more audit types, a set of selectable audit types, and a computer program adapted to automatically select an audit sample subset of loan origination records or loan servicing records according to one or more selected audit type and the set of sampling criteria, and automatically create and transmit to an auditor client workstation a checklist appropriate to the selected audit type.

In another aspect, the invention comprises computer-assisted method of auditing loan portfolios and loan servicing portfolios wherein loans are of a plurality of types comprising the steps of storing on a server a computer record for each loan in a portfolio; storing on the server rules which comprise each current and historical legal regulation and any investor-specific parameter applicable to each type of loan; storing on the server a set of selectable audit types; storing on the server a set of questions to determine compliance with each regulation or parameter, each question keyed to one or more audit types; periodically adding questions to the set of questions as new regulations or parameters are promulgated, storing on the server a set of sampling criteria comprising historical error rates, confidence intervals, and precision; automatically selecting an audit sample subset of records according to one or more selected audit types and applicable sampling criteria; automatically creating and transmitting to an auditor client workstation the audit sample subset of records and a checklist of questions keyed to the selected audit type; storing auditor's answers to the checklist questions, including any exceptions, in an audit trail database on a server; storing any auditor recommendations pertaining to any of the exceptions in the audit trail database; and automatically generating management reports comprising the sampling criteria, an exception rate pertaining to the subset, a list of any loans in the subset which have exceptions and the exceptions pertaining to each such loan, and any recommendations for cure of each type of exception found in the sample subset. The audit sample subset generated by the system and method can be automatically requested from a file management system.

In some embodiments the records include both alphanumeric data and graphical images of loan documents, and the data and images for each loan in the sample subset are served up to the auditor's client workstation.

The hyperlinks to the management reports can be automatically e-mailed to appropriate managers, optionally along with a time-limited password, and optionally sending reminders to managers to request a response, or notifications of past due responses. The audit reports containing the exceptions can be stored in an audit trail record, and managers' responses to the exceptions can also be stored in that audit trail record.

A report as to in-process audits and time expended by auditors in auditing each subset can also be generated by the method and system of the invention. The system can also calculate auditor time per loan audit, number of audits per period, and quality score. Historical exception rate reports, trend reports based on current and historical audits, and systemic root cause reports can also be automatically generated.

Sampling criteria which are used by the system and method can include historical exception rates, confidence intervals, and precision.

When the managers respond to the exceptions raised by the auditors, the managers' responses are known as rebuttals, and the system can record them and calculate rebuttal rates which can be used to evaluate the performance of auditors. The system also can be used to calculate historical trends of exceptions and the method can use the trends to determine changes in quality of loan origination and/or servicing activities. Such trend information can be very useful to management in improving the quality of the loan origination, servicing, and auditing functions.

The computer program itself, recorded or encoded in any computer-readable medium, which functions to control the system and perform the methods of the invention, is another aspect of the invention.

BRIEF DESCRIPTION OF THE DRAWINGS

FIG. 3 illustrates a screen showing a claim trends analysis generated by the system;

DETAILED DESCRIPTION OF THE INVENTION AND THE PREFERRED EMBODIMENTS

A few embodiments of the invention will be described by reference to the drawings.

Figure 1:
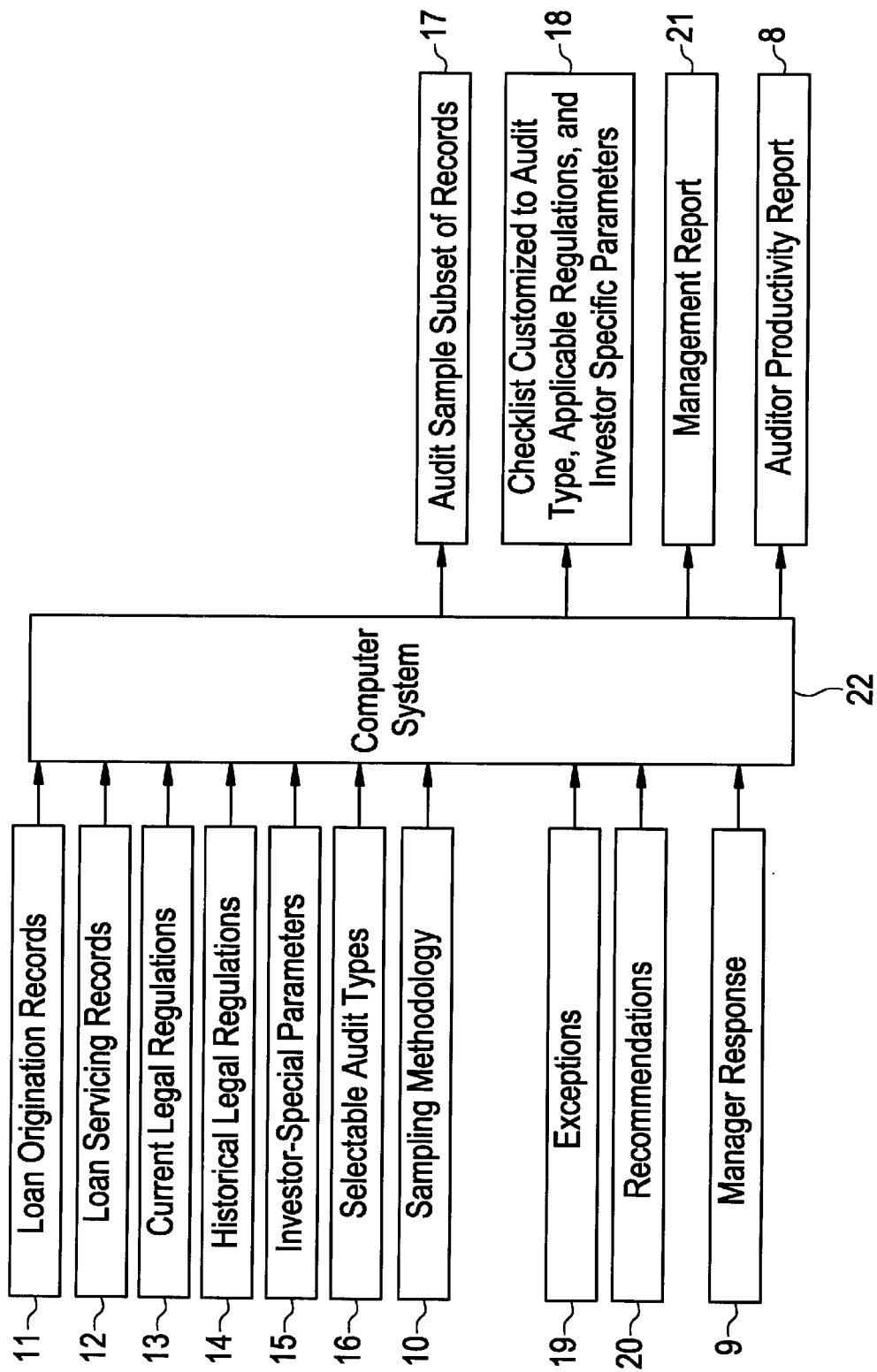
FIG. 1 is a schematic flow diagram of a preferred method of the invention.

Referring first to FIG. 1, the steps in a preferred embodiment of the invention include establishing a computer system 22 which includes a processor, storage means, and a program. Loan origination records 11 are created in any conventional way, for example by entering name, address, loan number, date of loan, address of property, type of mortgage, originating institution, and the like. In a like manner, loan servicing records 12 are created on the computer system. Unlike prior systems, the system of the invention includes storing current legal regulations 13 and historical legal regulations 14 on the computer system, preferably on the server, as well as investor, specific parameters 15, which are also stored on the server.

Sampling methodology 10 is also stored on the server, and selected sampling parameters or criteria can include historical exception rates, confidence intervals, and precision. The number of records selected by the system is controlled in part by these sampling parameters or criteria.

Examples of United States legal regulations which are typically stored are federal Truth-In-Lending (Regulation Z); Real Estate Settlement Procedures Act (RESPA); Fair Debt Collection Act; Fair Credit Reporting Act; and various state laws related to mortgage lending and mortgage servicing.

Examples of investor-specific parameters 15 which can be stored are those of certain investment banks which act to securetize a portfolio of loans, for example a bank may require that no "real estate owned" (REO), i.e., foreclosed-upon property, be sold without the bank's written authorization, whereas a government agency such as GIN-NIE MAE, may permit the mortgage servicer to use its own discretion when selling REO's, subject to published guidelines. Other examples of investor-specific parameters are the time limits within which claims must be filed or else insurance under VA and FHA will be lost. Such time limits do not apply to loans transferred to non-government banks.

In the mortgage origination and mortgage servicing industries there are a large number of audit types which are typically performed periodically, but each type is performed over differing time periods.

Each type of audit can be separately defined. There are some types of audits which are used for loan originations, and other types for loan servicing, while other types may be for loans on property in a certain geographic area such as a state, and others for certain investors. Typically there are over 100 types of audits, and each type has a corresponding and unique set of questions which must be answered. The applicable questions may vary as regulations and parameters are changed over time. Table 1 sets forth a few of those audit types.

TABLE I

| AUDIT TYPE (criteria) |
| --- |
| Portfolio Escrow Analysis |
| Portfolio Reconveyance |
| HUD ARM Loans |
| HUD Payoff |
| VA Payoff |
| VA ARM Loans |
| HUD MIP Billing |
| Conventional ARM Loans |
| Conventional Payoff |
| Conventional Balloon Mortgage |
| Portfolio Escrow Tax |
| Portfolio Escrow Insurance |
| Portfolio Customer Inquiries |
| Portfolio Credit Bureau |
| SBC Call Monitoring |
| STL Call Monitoring |
| Conventional Perferred Client |
| Portfolio New Loan Setup |
| Portfolio Service Release |
| Portfolio Cash Operations |
| HUD Workouts |
| HUD Foreclosure |
| HUD Claims |
| HUD Late Stage Collections |
| VA Late Stage Collections |
| VA Early Stage Collections |
| HUD Early Stage Collection |
| VA Claims |
| Loan to value ratio greater than 80% with cashout |
| VA Workouts |

There are typically at least 3,000 unique questions in the list from which a checklist for a particular type of audit is constructed by this system. Questions are added or inactivated each time a legal regulation, investor requirement, or policy reason requires it. For each question in the list, a date field, an audit type field, and an exception statement are provided. Thus the questions are in effect rules which are called up when an included type of audit is requested, but are otherwise not called up so they are not included in the questionnaire when inappropriate for the selected audit.

Upon selection of the audit's criteria 16, and sampling criteria 10, the software program controlling the computer processor on the server generates an audit sample subset of loan records 17 from the full set of records 11 and 12 and transmits an appropriate file to the workstation of the auditor. A query of records in the portfolio matching the review description is obtained and imported into the system where they are stored on a database. The database is comprised of tables that are updated when new records are imported. A unique "key" is then assigned to each new record as means of identification; any update or entry pertaining to the specific record is associated by the system to the record "key".

The auditor may be at a different location than the server or the various people inputting records and the like. By use of client server methodology, preferably using a global computer network such as the Worldwide Web with appropriate password protection, the subset of records 17 can be presented at the auditor's workstation very readily and efficiently. Based on the legal regulations which apply to each loan or loans servicing record, either current legal regulations 13 or historical legal regulations 14, investor-specific parameters 15, and other criteria 16 are referred to by the processor in generating a checklist 18. The checklist is customized to the aforementioned criteria, regulations, and parameters. In the prior art, standard checklists were used for any audit, and it was sometimes up to the auditor to decide which of the questions in the standard checklists applied to the particular type of audit being conducted, as well as any investor-specific parameters to be considered. The present invention has an advantage over the prior method in that it insures that all questions pertaining to the type of audit being conducted by the auditor are answered, so that a statistically accurate error rate can be determined.

Due to the complexity of loan servicing operation, checklists are customized to serve different purposes, so each review should have a unique set of questions directly pertaining to the scope of the review. To illustrate, HUD 235 and HUD Pay Off reviews will have different questions applying to each. Checklists are also stored on tables on the database. These tables are updated through the user interface and no additional programming is necessary. The security level assigned to the user restricts access to this database. The interface supports addition, editing and deletion (inactivation) of a checkpoint within the checklist. "Additions" to the checklists are stored and recognized by the system by assigning a new item ID to the entry. "Editing" is allowed for existing checkpoints. Should the need to delete a checkpoint arise, "Deletion" removes that item from the active checklist. Since historical data may have been stored for a specific checkpoint, the system does not replace the reference code once the checkpoint has been deleted. The checkpoint is placed on a list of deleted (inactive) checkpoints, which could be made active if necessary.

Therefore, the checklist is prepared by the system for the auditor to use during the review, and the checkpoints or items on the checklist are particular to the sample being reviewed and are the correct currently applicable ones based on current or applicable regulations and other rules. Although the active checkpoints on a checklist may vary, the historic information for that checkpoint is not lost.

Using the checklist and either the paper, or microfilm, or scanned documents in the loan or loan servicing files, the auditor may find exceptions 19 when one or more of the checklist items cannot be answered yes and must be answered no.

The system (program) uses the checklists and specifically the checkpoints within them to calculate the Exception Rate by using the following premise:

$$\text{Exception Rate} = \frac{\text{Errors}}{\text{Numbers of Opportunities}^*}$$

$*$ Number of Opportunities =

Sample Size × Number of Checklist items.

The checkpoints are stored permanently even though they may not be active, and this allows for historical information display and reporting.

The system enables detail reporting of exception significance, providing ability to study trends and risks assessment of operations.

The question ID is also used by the system to arrange any exception found in such order so that one recommendation is provided for the exception, which in turn will appear on the management report.

Table 2 is an example of a checklist generated for a HUD-35 audit

TABLE 2

AUDITOR CHECKLIST FOR HUD-235

| SORT_ORDER | QUESTION_DESCRIPTION |
|---|---|
| 1 | Was the HIP cost determination information accurate? |
| 2 | Did the Escrow Analysis reflect accurate MIP disbursement projections? |
| 3 | Were current loans with terminated assistance without subsidy funds? |
| 4 | Were unapplied/excess subsidies returned to HUD? |
| 5 | Were suspense monies(full payment) applied timely? |
| 6 | Did government subsidy accounts indicate distributed funds? |
| 7 | Was the gross annual/monthly income accurately calculated? |
| 8 | Was the gross monthly income accurately disclosed on the Payment Notice? |
| 9 | Was employment accurately verified? |
| 10 | Was payment information consistent on the loan servicing system? |
| 11 | Was escrow analysis at recertification documented on LSAMS? |
| 12 | Did subsidies received match subsidies billed/recertified? |
| 13 | Was occupancy/social security number adequately verified? |
| 14 | Were earned subsidies applied on loans in foreclosure? |
| 15 | Was the lesser of 2 premiums from the insurer used in the calculation of subsidy? |
| 16 | Was systems escrow analysis concurrent with recertification analysis? |
| 17 | Was prior years recertification/histories complete? |
| 18 | Was overpaid assistance (OPA) calculated accurately? |
| 19 | Was the eligible minor deduction entered in the mortgage recertification? |
| 20 | Was assistance computed accurately? |
| 21 | Was assistance properly suspended, terminated, or reinstated? |
| 22 | Was escrow shortage/overage handled appropriately? |
| 23 | Was family composition accurate? |
| 24 | Were subsidies received credited to the borrower's account? |
| 25 | Was the loan amount on recertification accurate? |
| 26 | Was the FHA Case Number accurate? |
| 27 | Was HUD billed for assistance between the 5th and 20th day of the month? |
| 28 | Were Forms HUD 93101-A or HUD 93102 accurate? |
| 29 | Was Form HUD 93102 submitted before the 20th day of the month? |
| 30 | Were billing forms adequately supported? |
| 31 | Was the Formula II factor used in calculation accurate? |

TABLE 2-continued

AUDITOR CHECKLIST FOR HUD-235

| SORT_ORDER | QUESTION_DESCRIPTION |
|---|---|
| 32 | Were late charges properly assessed? |
| 33 | Was recertification completed within the allowed timeframe? |
| 34 | Was the Formula One total payment used in recertification accurate? |
| 35 | Was the payment notice consistent with LSAMS/file information? |
| 36 | Were monthly handling charges properly collected? |
| 37 | Was information about assistance amounts on year-end tax and interest statements present? |
| 38 | Was the field office alerted concerning possible mortgagor fraud? |
| 39 | Was HUD billed for assistance only when mortgage assumptors were eligible to participate in program? |
| 40 | Did overpayment result from something other than mortgagor fraud, misrepresentation, or failure to meet contractual obligation? |
| 41 | Was the overpayment caused by something other than an error by mortgagor/mortgagee? |
| 42 | Was a full refund of overpaid assistance, handling charges, and interest penalties remitted? |
| 43 | Was repayment of overpaid assistance arranged with the borrower without causing a default? |
| 44 | Were mortgage payments adjusted when borrower income increased $50.00 or more? |
| 45 | Was accounting of all assistance paid for each mortgagor accurate/timely? |
| 46 | Was recapture accomplished as required? |
| 47 | Was self-employment income computed accurately? |
| 48 | Was notice sent before 10 days prior to due date of first payment following recertification? |
| 49 | Was the escrow portion, the borrower's portion and the total payment amount accurate on the mortgagor's Payment Notice? |
| 50 | Was annual escrow account disclosure statement sent within 90 days following reinstatement from delinquency? |
| 54 | Were applicable guidelines applied to the case? |
| 60 | Were borrower inquiries containing requisite information acknowledged within 20 business days and responded to in writing within 60 business days of receipt? |
| 81 | Was re-certification of HUD 235 eligibility handled timely? |

As can be seen from Table 2, a large number of items are presented to the auditor in a typical audit. The reason for the discontinuity of the sort order is that some items are inactive because they do not currently apply to this type of audit.

The computer system also stores a set of recommendations which may be included by the auditor when corresponding exceptions are found. The recommendations 20 can be very complex, as demonstrated by the examples of stored recommendations shown in Table 3.

TABLE 3

AUDITOR RECOMMENDATIONS

| SORT_ORDER | QUESTION_DESCRIPTION | RECOMMENDATION |
|---|---|---|
| 2 | Was the foreclosure initiated timely? | The Department should ensure that foreclosures are referred to the attorney within the specified guidelines. An aging report could be utilized by management to flag accounts in foreclosure that need to be referred to an attorney immediately. The report could be created to identify accounts that have been passed from other departments late, subsequently affecting the foreclosure process. |
| 2 | Was the foreclosure initiated timely? | The Department should ensure that the foreclosure is initiated timely. The servicer should refer the mortgage to an attorney to begin foreclosure proceedings no later than 45 days after the date it issued the breach letter. (FNMA Servicing Guide, VIII, 102.04) |
| 9 | Was the case file received by the attorney within 24 hours of referral? | The Department should ensure that the case file is received by the assigned attorney within 24 hours of the referral. Close monitoring of the referral process should be conducted to avoid any foreclosure processing delays. |
| 20 | Was a BPO ordered 30 days prior to the foreclosure sale date? | The Department should ensure that the BPO is ordered 30 days prior to the foreclosure sale as specified in FNMA guidelines. Management has communicated that procedures to ensure compliance have been implemented. The Quality Control Department will monitor and trend this exception. |
| 30 | Was the foreclosure completed within the state required time? | The Department should ensure that Foreclosures are completed within the required state time frame. Close monitoring should be conducted to avoid any foreclosure processing delays. Indemnification against attorneys or oursource vendors should be pursued, if applicable. |
| 33 | Were the bidding instructions for the foreclosure sale within the specified guidelines? | The Department should ensure that bidding instructions are sent to the Foreclosure Attorney at least five business days prior to the scheduled sale date. Management should generate a report to identify all sales scheduled during the next 30 days to ensure the bidding instructions are sent to the attorney timely. |
| 36 | Was the hazard insurance policy canceled (forced placed) 15 days after the foreclosure sale or within 15 days of the property becoming vacant? | The Department should ensure that the hazard insurance is cancelled 15 days after the foreclosure is completed and it has been determined that no damage has occurred to the property. Management should communicate this function with the REO Department in order to streamline this process in detail. This will ensure recovery of funds on unearned premiums |

The auditor may make recommendations other than standard, stored recommendations. All of the recommendations and exceptions are stored in the computer system 22 and are processed to generate management report 21. Management reports can comprise the sampling criteria, and exception rate pertaining to the subset, a list of any loans in the subset which have exceptions and the exceptions pertaining to each such loan, and any recommendations for cure of each type of exception found at the sample subset. This automatically generated the management report 21 can be automatically e-mailed to appropriate managers. The report can be in hypertext markup language (HTML) and the e-mail can include hyperlinks to the reports. The manager can be given an automatically generated temporary password to allow access to the report, and the expiration date of the password can act as a time limit for the manager's response to the report.

The manager may respond 9 to the exceptions which are stored in the audit trail record, and such responses are also stored in the audit trail record. For example, the manager may disagree with an exception found by an auditor.

A report as to in-process audits and time expended by auditors 8 in auditing each subset of records can be generated and stored in the audit trail record. Such reports can be used by managers to evaluate the performance of auditors and quality of audits and evaluate the cycle time and evaluate the impact of changes, as illustrated in FIG. 7.

Figure 3:
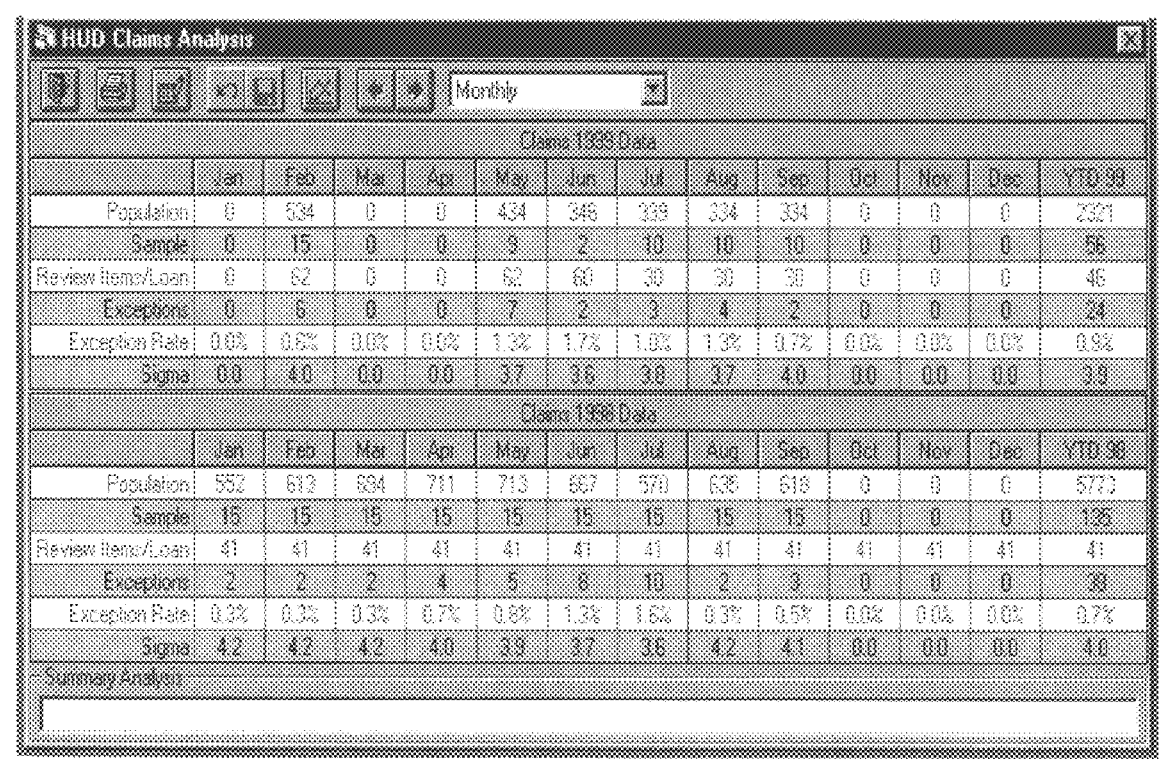
Figure 4:
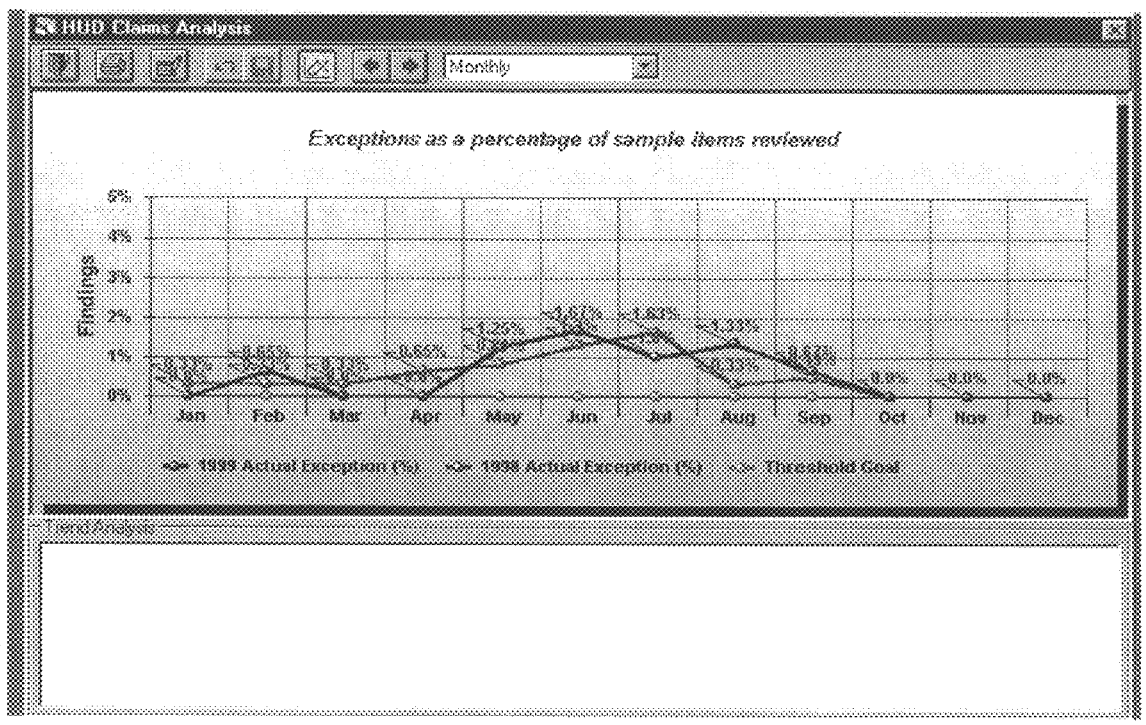
FIG. 4 illustrates a graphical representation of FIG. 3 data.
Figure 5:
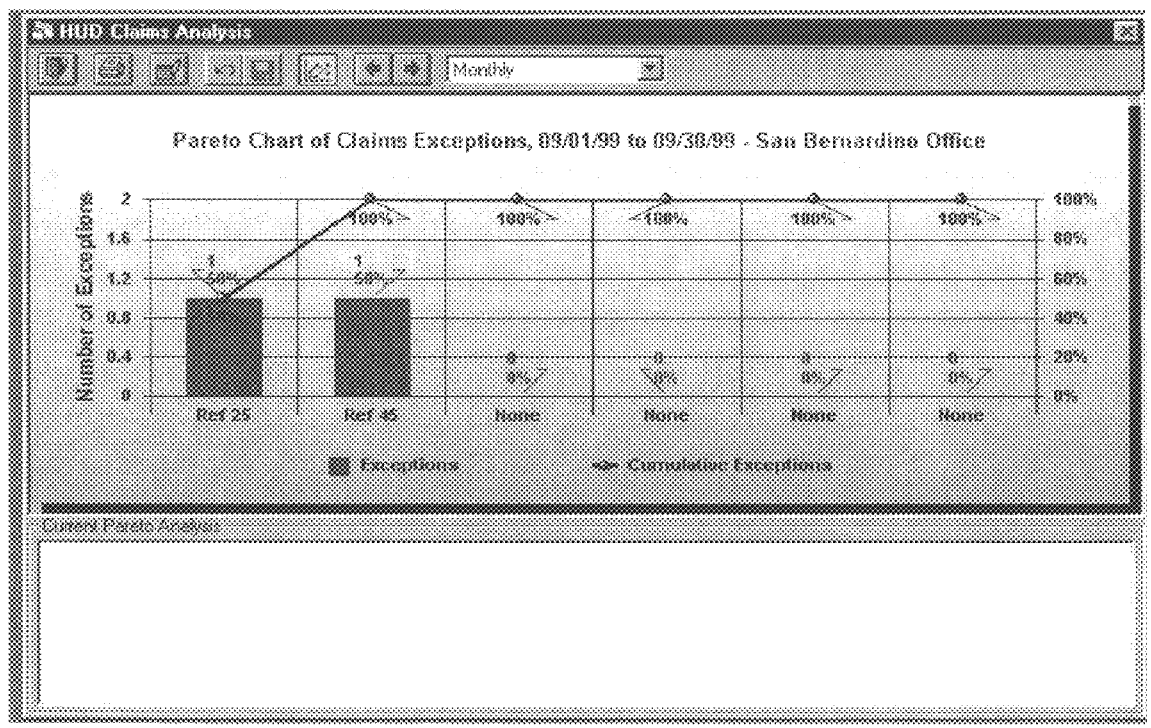
FIG. 5 illustrates a root cause of exceptions analysis screen.
Figure 6:
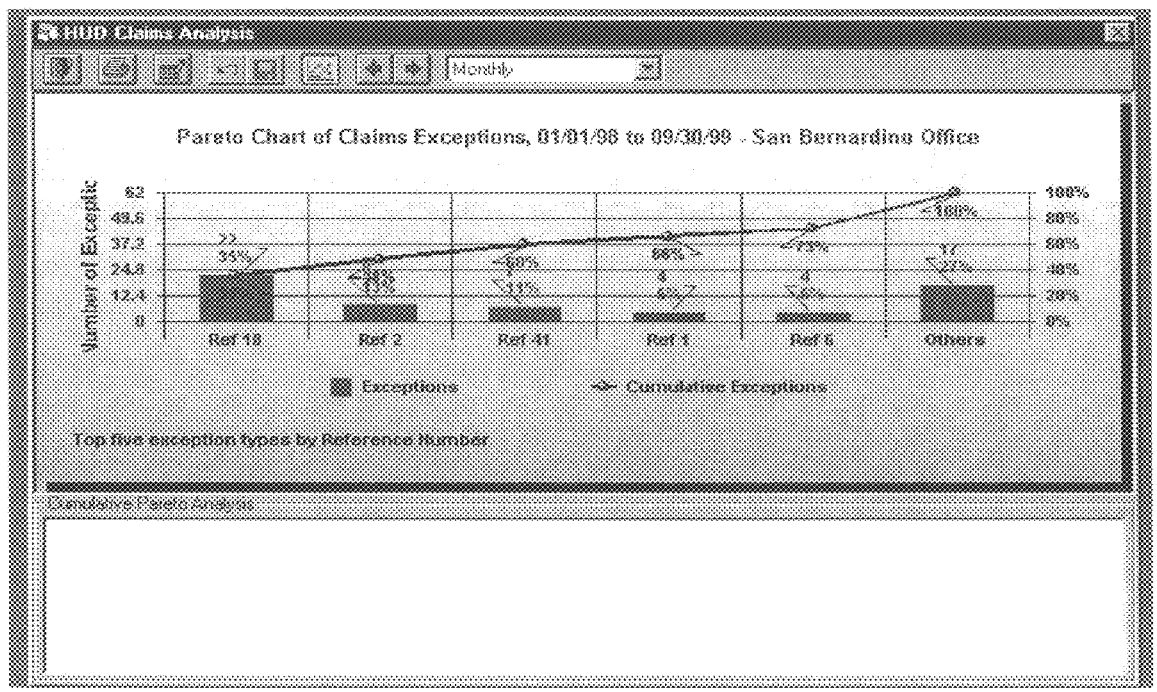
FIG. 6 illustrates a root cause of exceptions analysis of a period including previous year and year-to-date.

Historical exception rates trends, root causes of exceptions analysis, and a wide variety of analysis can be automatically put in report form 21 and reported to management. An example of a claim trends analysis report is illustrated in FIG. 3, and a graphical representation is illustrated in FIG. 4. A root cause exceptions analysis report is illustrated in FIG. 5, and FIG. 6 illustrates a root cause exceptions analysis of a period a root cause of exceptions analysis for a period including the previous year and current year-to-date. The calculation of historical exception rates is very useful for many reasons, among which are that sample size criteria can be adjusted based on historical exception rates. For example, if exception rates are lower, the number of records in a sample can be reduced.

The system of the invention also permits calculation of rebuttal rates, i.e., managers' demonstrating an audit error regarding an exception, and use of such rebuttal rates to evaluate the performance of auditors. Rebuttal rates are calculated from the data on rebuttals which are entered by managers in cases where exceptions found by auditors are disputed.

The historical trends of exceptions which are calculated by the system can also be used to determine changes in quality of loan origination and/or servicing activities, which are very important functions in this industry.

Figure 2:
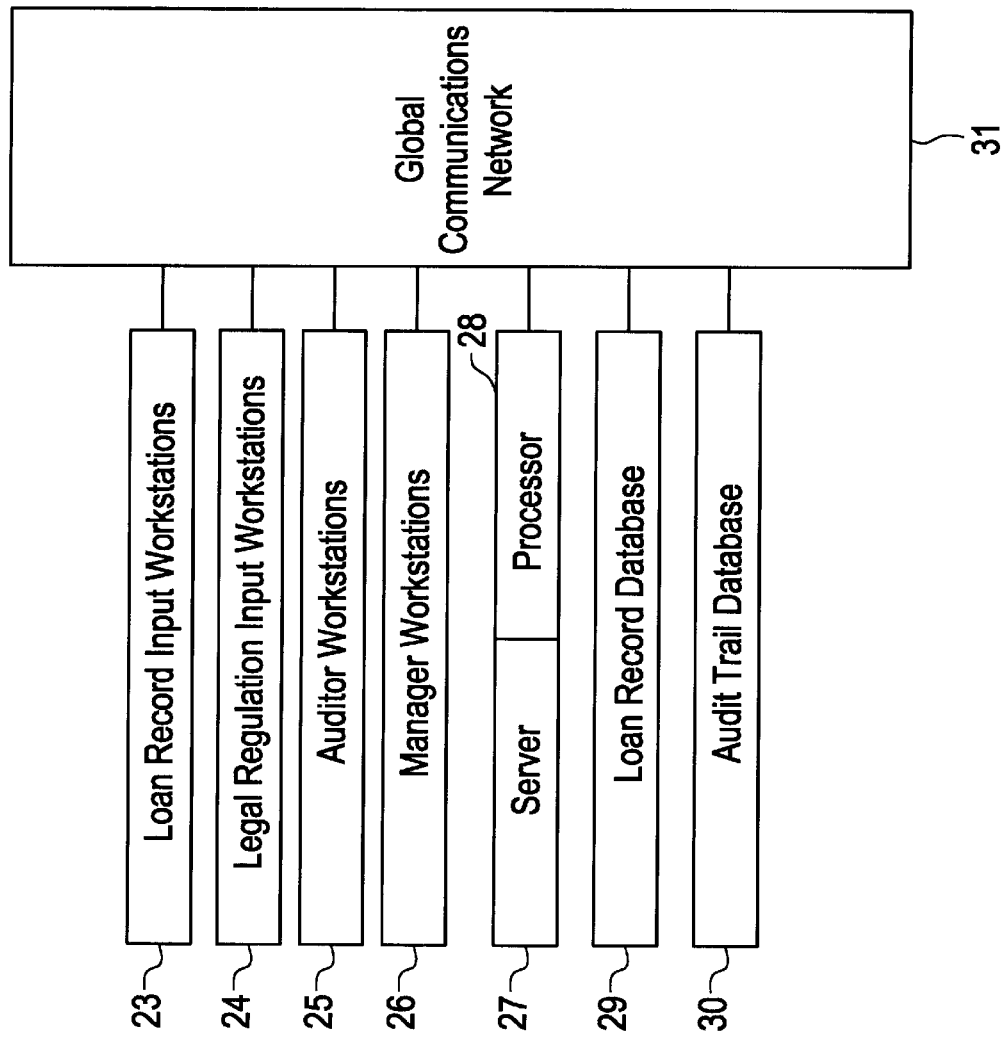
FIG. 2 is a block diagram of a preferred computer system of the invention.

Referring now to FIG. 2, the client-server computer system of the invention can include one or more processor 28 and one or more server 27 connected to a global communication network 31. The clients and servers can communicate via internet protocol. The loan record database 29 can include a plurality of databases which may or may not be at the same location as the server 27. The audit trail database 30 may also be at a different location than the server.

A plurality of client workstations are typically included in the system, among which are one or more loan record input workstations 33, legal regulations workstations 24, auditor workstations 25, and manager workstations 26.

The server 27 has access to the records for each loan origination and loan servicing in the portfolio as well as the rules which comprise each current and historical legal regulation and any investor-specific parameter applicable to each type of loan or loan servicing. The system also includes a set of selectable audit criteria and a computer program adapted to automatically select an audit sample subset of loan records or loan servicing records which meet the selected audit criteria and to automatically create and transmit to an auditor/client workstation a checklist appropriating to the selected audit criteria.

The program is adapted to store in an audit trial database the auditor's answer to the checklist, including any exceptions due to failure to satisfy a checklist item, and any auditor's recommendations pertaining to any of the exceptions. The recommendations can be either selected from a stored set or can be flexible, i.e., tailored by the auditor to a particular situation.

The records can include both alphanumeric data as well as images of loan documents which may have been scanned and stored in the system's memory so that when the auditor's client workstation calls up a loan record, it can also call up the graphical images of the original loan documentation which are typically used by the auditors in performing their checklist function.

While the invention has been described and exemplified in detail herein, it will be appreciated that various modifications, variations, and improvements of the invention can be made by those skilled in this art without departing from the spirit and scope of the invention.

What is claimed is:

1. A computer-assisted method of auditing loan portfolios and loan servicing portfolios wherein loans are of a plurality of types comprising the steps of
   storing on a server a computer record for each loan in a portfolio;
   storing on the server rules which comprise each current and historical legal regulation and any investor-specific parameter applicable to each type of loan;
   storing on the server a set of selectable audit types;
   storing on the server a set of questions to determine compliance with each rule, each question keyed to one or more audit types;
   periodically adding questions to the set of questions as new rules are promulgated;
   storing on the server a set of sampling criteria comprising historical error rates, confidence intervals, and precision;
   selecting one or more selected audit types and sampling criteria by inputting appropriate selection data with an input device;
   automatically selecting an audit sample subset of loan records in response to said selection of one or more selected audit types and sampling criteria;
   automatically generating the audit sample subset of loan records and a checklist of questions appropriately customized for the one or more selected audit types by automatically forming the checklist of questions from those keyed to the one or more selected audit types;
   storing auditor's answers to the checklist questions, including any exceptions, in an audit trail database on a server,
   storing any auditor recommendations pertaining to any of the exceptions in the audit trail database; and
   automatically generating management reports comprising the sampling criteria, an exception rate pertaining to the subset, a list of any loans in the subset which have exceptions and the exceptions pertaining to each such loan, and any recommendations for cure of each type of exception found in sample subset.

2. Method according to claim 1 wherein the records include both alphanumeric data and graphical images of loan documents, and the data and images for each loan in the sample subset are served up to the auditor's client workstation.

3. Method according to claim 1 wherein hyperlinks to the management reports are automatically e-mailed to appropriate managers, optionally along with a time-limited password, and optionally sending reminders to managers to request a response, or notifications of past due responses.

4. Method according to claim 1 wherein a manager's response to exceptions are stored in an audit trail record.

5. Method according to claim 1 wherein a report as to in-process audits and time expended by auditors in auditing each subset is generated, and optionally calculating auditor time per loan audit, number of audits per period, and quality score.

6. Method according to claim 1 wherein historical exception rate reports, trend reports based on current and historical audits, and systemic root cause reports are automatically generated.

7. Method of claim 1 wherein the sampling criteria include historical exception rates, confidence intervals, and precision.

8. Method of claim 1 wherein rebuttal rates are calculated and used to evaluate the performance of auditors.

9. Method of claim 1 wherein historical trends of exceptions are calculated and used to determine changes in quality of loan origination and/or servicing activities.

10. A computer based system for auditing loan and loan servicing portfolios comprising
a workstation for use by a loan portfolio auditor
a server on which is stored
  records for each loan origination and loan servicing in a portfolio,
  rules which comprise each current and historical legal regulation and any investor-specific parameter applicable to each type of loan and loan servicing, a set of sampling criteria, a set of questions to determine compliance with each of the rules, each question keyed to one or more audit types,
  a set of selectable audit types, and
  a computer program adapted to
    automatically select an audit sample subset of loan origination records or loan servicing records according to one or more selected audit type and the set of sampling criteria, and
    automatically create and transmit to an auditor client workstation a checklist of questions keyed to the selected audit type.

11. System according to claim 10 wherein the program is adapted to store in an audit trail database the auditor's answers to the checklists, including any exceptions due to failure to satisfy a checklist item, and any auditor recommendations pertaining to any of the exceptions.

12. System according to claim 10 wherein the program is adapted to generate management reports comprising audit sampling criteria, exception rate pertaining to the sample subset, any loans which have exceptions, the exceptions pertaining to each such loan, and any auditor recommendations for cure of each such type of exception found in the sample subset.

13. System according to claim 10 wherein the records include both alphanumeric data and images of loan documents, and the program is adapted to serve up to the auditor's client workstation data and images for each loan or loan servicing in the sample subset.

14. System according to claim 10 adapted to automatically e-mail to appropriate managers hyperlinks to the management reports.

15. System according to claim 10 wherein adapted to store manager's responses to exceptions in the audit trail record.

16. System according to claim 10 adapted to generate a report as to in process audits and time expended by auditors in auditing each audit sample subset.

17. System according to claim 10 adapted to generate historical exception rates and trend reports based on current and historical audits.

18. System according to claim 10 adapted to calculate sampling size criteria based on historical exception rates.

19. System according to claim 10 adapted to calculate rebuttal rates suitable for use in evaluating the performance of auditors.

20. System according to claim 10 adapted to calculate historical trends of exceptions suitable for determining changes in quality of loan origination and/or servicing activities.

21. System according to claim 10 wherein the sampling criteria comprise one or more of historical error rates, confidence intervals, and precision.

22. System according to claim 10 wherein the audit sample subset can be automatically requested from a file management system.

23. A computer assisted method of auditing loan portfolios or loan servicing portfolios, wherein loans in the loan portfolios or the loan servicing portfolios are of a plurality of distinctly different types for auditing purposes, the method comprising the steps of:
  storing in a memory a computer record for each loan in a portfolio;
  storing in the memory rules which comprise current and historical legal regulations and investor-specific parameters applicable to each type of loan;
  storing in the memory a set of selectable audit types;
  storing in the memory a set of questions to determine compliance with each rule, with each question keyed to at least one audit type;
  selecting a particular audit type and sampling criteria for selecting a subset of records to be audited by inputting appropriate selection data with an input device;
  automatically selecting an audit sample subset of records in response to said selection of the particular type and sampling criteria; and
  automatically generating an audit checklist of questions appropriately customized for the selected audit type by automatically forming the audit checklist from those questions keyed to the particular audit type.

24. The method of claim 23, wherein each question in the set of questions comprises a data field and an audit type field, the audit type field identifying the different types of audits for which that question is appropriately included on the audit checklist.

25. The method of claim 23, wherein questions are added or inactivated each time a legal requirement, investor requirement or policy reason requires it.

26. The method of claim 23, further comprising the step of:
  specifying whether current or historical legal regulations and investor-specific parameters are to be applied in creating the audit checklist.

* * * * *

UNITED STATES PATENT AND TRADEMARK OFFICE
CERTIFICATE OF CORRECTION

PATENT NO. : 6,643,625 B1
DATED : November 4, 2003
INVENTOR(S) : Acosta et al.

It is certified that error appears in the above-identified patent and that said Letters Patent is hereby corrected as shown below:

Column 1,
Line 44, "intererelated" should read -- interrelated --.

Column 8,
Line 31, "oursource' should read -- outsource --.
Line 60, delete the word "the".

Column 9,
Line 10, delete the phrase "as illustrated in FIG. 7".
Line 61, "trial" should read -- trail --.

Column 10,
Line 65, "are" should read -- is --.

Column 11,
Line 57, delete the word "wherein".

Signed and Sealed this

Twentieth Day of April, 2004

JON W. DUDAS
*Acting Director of the United States Patent and Trademark Office*